US010675792B2

(12) United States Patent
Jacobs

(10) Patent No.: US 10,675,792 B2
(45) Date of Patent: Jun. 9, 2020

(54) METHOD FOR PRODUCING THREE DIMENSIONAL FOAM ARTICLES

(71) Applicant: ZOTEFOAMS PLC, Surrey (GB)

(72) Inventor: Paul Jacobs, Surrey (GB)

( * ) Notice: Subject to any disclaimer, the term of this patent is extended or adjusted under 35 U.S.C. 154(b) by 461 days.

(21) Appl. No.: 15/313,816

(22) PCT Filed: May 22, 2015

(86) PCT No.: PCT/GB2015/051519
§ 371 (c)(1),
(2) Date: Nov. 23, 2016

(87) PCT Pub. No.: WO2015/177571
PCT Pub. Date: Nov. 26, 2015

(65) Prior Publication Data
US 2017/0197342 A1    Jul. 13, 2017

(30) Foreign Application Priority Data

May 23, 2014    (GB) .................................. 1409248.0

(51) Int. Cl.
| | | |
|---|---|---|
| *B29C 43/02* | (2006.01) | |
| *B29C 48/03* | (2019.01) | |
| *C08J 9/12* | (2006.01) | |
| *B29C 44/34* | (2006.01) | |
| *B29C 44/08* | (2006.01) | |
| *B29C 45/14* | (2006.01) | |
| *B29C 51/12* | (2006.01) | |
| *B29K 105/24* | (2006.01) | |
| *B29C 44/04* | (2006.01) | |
| *B29C 44/12* | (2006.01) | |
| *B29C 44/10* | (2006.01) | |
| *B29L 31/50* | (2006.01) | |

(52) U.S. Cl.
CPC ............. *B29C 43/02* (2013.01); *B29C 44/08* (2013.01); *B29C 44/3453* (2013.01); *B29C 45/14* (2013.01); *B29C 48/03* (2019.02); *B29C 51/12* (2013.01); *C08J 9/122* (2013.01); *B29C 44/04* (2013.01); *B29C 44/0423* (2013.01); *B29C 44/0461* (2013.01); *B29C 44/10* (2013.01); *B29C 44/105* (2013.01); *B29C 44/12* (2013.01); *B29C 44/1285* (2013.01); *B29C 44/3403* (2013.01); *B29C 44/348* (2013.01); *B29C 44/3484* (2013.01); *B29K 2105/24* (2013.01); *B29K 2995/0094* (2013.01); *B29L 2031/504* (2013.01); *C08J 2201/026* (2013.01); *C08J 2201/03* (2013.01); *C08J 2203/06* (2013.01); *C08J 2300/22* (2013.01); *C08J 2300/26* (2013.01); *C08J 2371/02* (2013.01); *C08J 2377/06* (2013.01)

(58) Field of Classification Search
CPC ... B29C 44/08; B29C 44/348; B29C 44/3403; B29C 44/1285; B29C 44/105; B29C 44/3484; B29C 44/04; B29C 44/0461; B29C 44/0423; B29C 44/10; B29C 44/12
USPC ........................................................ 264/51
See application file for complete search history.

(56) References Cited

U.S. PATENT DOCUMENTS

| | | |
|---|---|---|
| 6,439,536 B1 | 8/2002 | Piccolo |
| 6,776,939 B2 | 8/2004 | Liu |
| 6,787,079 B2 | 9/2004 | Liu |
| 6,993,858 B2 | 2/2006 | Seamans |
| 7,052,634 B2 | 5/2006 | Liu |
| 7,146,751 B2 | 12/2006 | Seamans |
| 7,464,428 B2 | 12/2008 | Norton |
| 8,906,280 B2 | 12/2014 | Maranan |
| 2003/0046832 A1 | 3/2003 | Knoerr |
| 2005/0059747 A1 | 3/2005 | Berghmans |
| 2008/0207782 A1* | 8/2008 | Jacobs .................... B29C 44/08 521/54 |
| 2009/0026198 A1 | 1/2009 | Ichikawa et al. |
| 2010/0095556 A1 | 4/2010 | Jarvis |
| 2013/0140320 A1 | 6/2013 | Nadella |
| 2013/0149480 A1 | 6/2013 | Ichikawa et al. |
| 2014/0259801 A1 | 9/2014 | Grondin |
| 2015/0056895 A1* | 2/2015 | Fotou .................. B24D 11/001 451/59 |
| 2016/0122493 A1* | 5/2016 | Farris .................. A43B 13/125 521/82 |

FOREIGN PATENT DOCUMENTS

| | | |
|---|---|---|
| EP | 1 902 960 A1 | 3/2008 |
| GB | 2 014 153 A | 8/1979 |
| WO | WO 2013/153153 A1 | 10/2013 |

OTHER PUBLICATIONS

PCT International Search Report and Written Opinion, PCT/GB2015/051519, dated Oct. 1, 2015.

* cited by examiner

*Primary Examiner* — Joseph S Del Sole
*Assistant Examiner* — Lawrence D. Hohenbrink, Jr.
(74) *Attorney, Agent, or Firm* — Joseph T. Leone, Esq.; DeWitt LLP

(57) ABSTRACT

A process for making a three dimensional foam article of non-uniform shape employs a two-stage nitrogen autoclave process and a pre-form which has a non-uniform cross-section in at least one dimension.

29 Claims, No Drawings

METHOD FOR PRODUCING THREE DIMENSIONAL FOAM ARTICLES

CROSS-REFERENCE TO RELATED APPLICATIONS

This is a United States national phase entry of International Application Serial No. PCT/GB2015/051519, filed May 22, 2015, and published Nov. 26, 2015 as WO 2015/177571, which claims priority to Great Britain Application Serial No. 1409248.0, filed May 23, 2014, both of which are incorporated herein by reference.

FIELD OF THE INVENTION

The present invention relates to a process for making a three dimensional foam article of non-uniform shape and in particular a process which uses the nitrogen autoclave process.

BACKGROUND OF THE INVENTION

The nitrogen autoclave process has been used to produce polymer foams commercially for many years and is described in some detail in patents U.S. Pat. No. 3,640,915 and GB 899,389 as well as in books such as Polymeric Foams, edited by S. T. Lee and D. Scholz (CRC Press, 2009) and Handbook of Polymer Foams, edited by D. Eaves (Rapra Technology Limited, 2004). The process typically comprises three stages; in the first stage a solid polymer article is produced, in the second stage gas is absorbed into the polymer under high pressure and at elevated temperature and in the final stage the article is expanded to produce a foam.

In the current state of the art, extrusion has generally been used to produce the solid polymer article of the first stage as this is a cost effective method of producing a flat sheet that is relatively easy to handle and allows efficient loadings in the autoclaves required for the subsequent stages of the foaming process. However, whilst the extrusion process does produce a solid polymer article that can be easily and efficiently loaded into the autoclaves, it does limit the form of the final product to an essentially two dimensional rectangular sheet of uniform thickness, and whilst the sheet form of the product may be suitable for many applications it has become increasingly clear that for many high volume applications, such as the midsoles used in running shoes, a near-net-shape article of varying thickness would be highly desirable.

Various processes which employ pre-forms are disclosed in US2003/0046832; U.S. Pat. Nos. 6,776,939; 6,787,079; 7,052,634; 7,464,428; 8,906,280; GB2014153A and US2014/0259801. Other processes are disclosed in U.S. Pat. Nos. 6,993,858; 7,146,751 and 6,439,536.

Other processes for manufacturing three dimensional polymer foam articles are also known to those skilled in the art, however, these do not typically produce articles of uniform density or isotropic cell structure. For example, bead foam processes typically result in density variations where there is a change in thickness of the foamed part, and thermoforming processes typically result in an anisotropic cell structure being created, even if the initial cell structure of the foam was isotropic.

SUMMARY OF THE INVENTION

It has been discovered that, by replacing the usual sheet extrusion process used in the first stage of the nitrogen autoclave process with another method of forming the solid polymer article required for the second and third stages of the nitrogen autoclave process, it is possible to produce a near-net-shape foamed article or, in some instances, the finished foam article. As regards the method of forming the solid polymer article, injection moulding has been identified as the preferred process for high volume applications, although other processes, such as compression moulding, machining or additive manufacturing (i.e. 3D printing), are contemplated, particularly for small scale production runs where the cost of expensive tooling cannot be justified.

In one aspect, therefore, the present invention provides a process for making a three dimensional foam article of non-uniform shape comprising the steps of:
(a) providing a pre-form comprising a polymer in a pressure vessel
(b) subjecting the pre-form to at least one inert gas at a pressure higher than atmospheric in order to drive gas into the pre-form,
(c) raising the temperature of the pre-form to or above its softening point, wherein steps (b) and (c) can take place in any order or simultaneously,
(d) reducing the pressure to a pressure higher than atmospheric pressure but lower than the pressure of step (b) and then cooling the pre-form to below its softening point to result in a partially expanded article,
(e) transferring said article to a second vessel and heating it to a temperature above its softening point under a pressure of inert gas or air, and
(f) reducing the pressure whilst maintaining the temperature at or above the softening point of the polymer, in order to expand the partially expanded article to form a foamed article,
wherein the cross-section of the polymer pre-form in at least one dimension (preferably two, most preferably three dimensions) is non-uniform.

The resulting cell structure of the foamed article is preferably isotropic.

Alternatively, the present invention provides a process for making a three dimensional foam article of non-uniform shape comprising the steps of: (a) preparing a solid polymer pre-form, (b) subjecting the solid polymer pre-form to at least one inert gas at a pressure higher than atmospheric in order to drive gas into the polymer pre-form, (c) raising the temperature of the polymer pre-form to or above its softening point, wherein steps (b) and (c) can take place in any order or simultaneously, and (d) reducing the pressure whilst maintaining the temperature at or above the softening point, in order to expand the polymer pre-form to a foamed article, wherein preferably the cross-section of the polymer pre-form in at least one dimension (preferably two, most preferably three dimensions) is non-uniform.

A key difference between the present process and prior art processes is that the pre-form is pre-shaped to produce a finished product which is near-net-shape. This allows more complex foam shapes with varying cross-sections to be produced more easily and with minimum scrap. Regular shaped flat sheets require significant numbers of secondary operations to achieve complex shapes and there is often a significant amount of scrap generated, particularly if the part is irregularly shaped or has cut-outs.

The temperature of the partially expanded polymer pre-form resulting from step (d) may be reduced to slow the loss of the gas from the polymer pre-form. For example, the gassed pre-form may be transferred to a freezer to prevent gas loss, thereby allowing more time between the gassing and expansion steps if required. This is an additional step that can optionally occur between steps (d) and (e) of the process. The decoupling of the gassing and expansion steps is very helpful in a production context as it allows the expansion stage to be delayed pending the availability of an expansion vessel or even the transport of the gassed pre-form to an expansion vessel in a different location. Thus the partially expanded article of step (d) may be stored for a time period (preferably at least 4 hours, more preferably at least 12 hours, most preferably at least 24 hours) before being transferred to the second vessel of step (e).

The process may be a batch process.

The polymer of the pre-form is preferably cross-linked, and the polymer composition may include a coagent to modify the crosslinking behaviour of the polymer. If the polymer is cross-linked, it may be cross-linked by irradiating it with an electron beam or with gamma radiation. The radiation dose is preferably from 5 to 200 kGy.

The polymer of the pre-form may comprise one or more thermoplastic resins, and if so, one or more of the thermoplastic resins can be a thermoplastic elastomer (TPE). More preferably still, one or more of the thermoplastic elastomers may be a polyether block amide (PEBA) and/or one or more of the thermoplastic resins may be a thermoplastic polyurethane (TPU).

Preferably, the polymer of the pre-form is substantially free of nucleants, however, it may be pigmented or include other additives, modifiers or reinforcements, known to those skilled in the art, including functional additives such as conductive additives, antimicrobials, flame retardants and smoke suppressants.

The polymer pre-form may be injection moulded. If so, the polymer pre-form may be injection moulded using an overmoulding, insert moulding, twin or multi-shot injection or co-injection process.

Alternatively, the polymer pre-form may be compression moulded.

In a further alternative, the polymer pre-form may be produced using an additive manufacturing or 3D printing process.

Finally, the polymer pre-form may be extruded or co-extruded.

The polymer pre-form may be a 2.5D shape or a 3D shape.

The foamed article may also be a 2.5D shape or a 3D shape. If so, the foamed article may also be thermoformed to produce a second 3D shape. In this case, the foamed article may be a midsole for a shoe.

It is preferred that regions of the foamed article with the same polymer composition are substantially homogeneous. It is also preferred that the thermal and mechanical properties of the regions of the foamed article with the same polymer composition are isotropic.

The foamed article preferably has a density of less than 300 kg/m$^3$.

Advantageously, the pressure in step (b) is from 20 to 1000 bar, and more preferably still from 20 to 800 bar. It is particularly advantageous to maintain a constant pressure during step (b) in order to absorb a known quantity of gas into the pre-form, thereby controlling the density of the finished article more accurately. Only partially expanding the pre-form at the end of step (d) is also particularly advantageous as the release of pressure at the end of this step will result in significant adiabatic cooling, which makes it difficult to control the expansion process as at a certain temperature the polymer may become too cold to expand properly and the part may also become distorted. In addition, it is very inefficient to use the high pressure autoclave to fully expand the foam as the volume of foam produced from each cycle is much lower than can be produced by using a second, larger but lower pressure, vessel for steps (e) and (f) in a 2-stage process.

The pressure in step (e) is preferably from 5 to 200 bar, and more preferably still from 5 to 40 bar.

If the polymer of the pre-form is cross-linked, the temperature in step (c) is preferably from 5 to 135° C. above the softening point. If the polymer of the pre-form is cross-linked, the temperature in steps (e) and (f) should also preferably be from 5 to 135° C. above the softening point of the polymer.

Injection moulding is particularly advantageous, especially where high value polymers are used, as it allows large numbers of parts to be produced with minimal scrap. It also gives dimensionally accurate parts and allows high levels of detail to be achieved, for example, thin sections and textured surfaces. Overmouldings and multi-shot injection mouldings are also contemplated in which different areas of the moulding are comprised of different materials having different properties. In such instances, careful selection of the polymers or compounds and the processing parameters would be required, as well as the design of the mould, in order to prevent distortion of the final foamed part caused by differential foaming behaviour. Such differential foaming behaviour could be caused by factors such as the gas absorption characteristics, the rheological behaviour and the thermal expansion behaviour of the different materials.

Preferentially, the solid polymer article is a 2.5D shape (i.e. essentially flat on one side with a contoured profile), such as a midsole blocker, as this limits the opportunity for the article to slump or distort during the gas absorption or expansion stages of the nitrogen autoclave process, both of which are preferably performed above the softening point of the polymer. Subsequent compression moulding, or other foam fabrication processes known to those skilled in the art, can then be used to form the near-net-shape foamed article into a fully three dimensional (3D) finished article.

It has been discovered that it is particularly advantageous to crosslink the polymer pre-form prior to the gas absorption and expansion stages of the process in order to achieve good dimensional accuracy and uniformity of expansion. The level of crosslinking, together with the temperature and pressure of the gas absorption stage, can also be used to influence the degree of expansion and the final physical properties of the foam and may be beneficial in any subsequent processing, such as thermoforming. Where the pre-form is comprised of areas of different materials, crosslinking can be used to control the expansion behaviour of the different areas to ensure that the foamed part is of the desired dimensions. For example, dissimilar polymers may require different levels of crosslinking to give similar expansion ratios when subjected to the same temperatures and pressures during the gas absorption stage of the process. It is worth noting that, in the first instance, the required level of crosslinking for any given temperature and pressure could be determined for each polymer independently.

It is further contemplated that by using crosslinking to control the expansion behaviour, the foamed part could be made to have areas of different density and different characteristics, for example, physical properties such as hardness or resiliency. Varying the level of crosslinking in the polymer could be achieved by methods such as the use of coagents or, where irradiation is used, by varying irradiation dose. Where the pre-form is comprised of a single material, differential crosslinking of the material could still be achieved by exposing different areas of the pre-form to different levels of irradiation, for example, by masking of the pre-form or by precise targeting of the irradiation source. In all cases where dissimilar materials or differential crosslinking is used, care must be taken in the design of the solid polymer pre-form to accommodate any differences in the expansion ratios of the materials in order to ensure that the foamed part has the desired dimensions and physical properties.

EXAMPLES

The following examples are illustrative of preferred embodiments of the invention only.

Example 1

A polyether block amide (PEBA) polymer, Pebax 5533 from Arkema, was compounded with an irradiation cross-linkable additive to produce a crosslinkable PEBA material. The crosslinkable PEBA material was then injection moulded into the form of a football boot sole plate using the standard injection moulding conditions recommended by the Pebax 5533 manufacturer. The injection moulded sole plate was then subjected to gamma irradiation in order to crosslink the PEBA material. After irradiation the injection moulding was slightly darker in colour but showed no obvious change in dimensions.

The crosslinked injection moulding was placed on a tray in a high pressure autoclave and subjected to an atmosphere of nitrogen gas at 400 bar and 165° C. until the polymer was fully saturated with the gas. The pressure was then reduced to 170 bar, to nucleate a cell structure, before the autoclave was cooled to ambient temperature. Once at ambient temperature the remaining pressure was released and the gas containing injection moulding was removed from the high pressure autoclave. At this stage, the injection moulding was noticeably lighter in colour, because of the nucleated cell structure, and showed a 4% increase in dimensions.

The partially expanded injection moulding was placed in a freezer at −40° C. overnight to minimise any gas loss prior to expansion. The following day the injection moulding was allowed to return to room temperature before being placed on a tray in a lower pressure autoclave. The injection moulding was then heated to a uniform temperature of 167° C., under a pressure of 14 bar of nitrogen, before the pressure was released to atmospheric pressure, allowing the moulding to expand to form the foamed part.

In spite of the large variations in the thickness of the injection moulding, the expansion of the football boot sole plate was essentially uniform in all directions. The linear expansion ratio was 2.35±0.15, which equates to a final foam density of 80 kg/m$^3$.

Example 2

A polyether block amide (PEBA) polymer, Pebax 5533 from Arkema, was compounded with an irradiation cross-linkable additive to produce a crosslinkable PEBA material.

The crosslinkable PEBA material was then injection moulded into the form of 1/2.5 scale running shoe midsole pre-forms, left and right foot, using the standard injection moulding conditions recommended by the Pebax 5533 manufacturer. The 1/2.5 scale pre-form dimensions were calculated to give the required dimension of the expanded midsole at the target density of 70 kg/m$^3$. The injection moulded pre-forms were then subjected to gamma irradiation in order to crosslink the PEBA material. After irradiation the injection mouldings were slightly darker in colour but showed no obvious change in dimensions.

The crosslinked injection mouldings were placed in pairs on a tray in a high pressure autoclave and subjected to an atmosphere of nitrogen gas at 270 bar and 165° C. until the polymer was fully saturated with the gas. The pressure was then reduced to 150 bar, to nucleate a cell structure, before the autoclave was cooled to ambient temperature. Once at ambient temperature the remaining pressure was released and the gas containing mouldings were removed from the high pressure autoclave. At this stage, the mouldings were noticeably lighter in colour, because of the nucleated cell structure. The mouldings had also flattened slightly and showed a small (<2%) increase in dimensions.

The partially expanded mouldings were placed in a freezer at −40° C. to minimise any gas loss prior to expansion. Prior to expansion, the injection mouldings were allowed to return to room temperature before being placed, in pairs, on a tray in a lower pressure autoclave. The pairs of mouldings were then heated to a uniform temperature of 167° C., under a pressure of 14 bar of nitrogen, before the pressure was released to atmospheric pressure, allowing the mouldings to expand to form the foamed midsoles.

The expansion of the running shoe midsoles was essentially uniform in all directions. The linear expansion ratio was 2.4±0.1, which equates to a final foam density of 73 kg/m$^3$.

Comparative Example

Crosslinked PEBA running shoe midsole pre-forms were prepared as described in Example 2. As previously, the injection mouldings were slightly darker in colour after irradiation but showed no obvious change in dimensions. The crosslinked injection mouldings were placed in pairs on a tray in a high pressure autoclave and subjected to an atmosphere of nitrogen gas at 270 bar and 165° C. until the polymer was fully saturated with the gas. The pressure was then reduced to atmospheric pressure, to allow the mouldings to expand to form the foamed midsoles, and the autoclave was then cooled to ambient temperature. Once at ambient temperature the mouldings were removed from the high pressure autoclave.

Unlike in Example 2, the mouldings had not expanded to their full dimensions and had become distorted. However, the mouldings were noticeably lighter in colour, which indicates that some degree of nucleation and cell growth had occurred during the process. The linear expansion ratio was only 1.1±0.15, which equates to a final foam density of 700 kg/m$^3$.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in UK patent application number 1409248.0, from which this application claims priority, and in the abstract accompanying this application are incorporated herein by reference.

The invention claimed is:

1. A process for making a three dimensional foam article of non-uniform shape comprising the steps of:
   (a) providing a pre-form comprising a polymer in a pressure vessel;

(b) subjecting the pre-form to at least one inert gas at a first pressure higher than atmospheric pressure in order to drive the at least one inert gas into the pre-form;

(c) raising the temperature of the pre-form to a temperature at or above its softening point, wherein steps (b) and (c) can take place in any order or simultaneously;

(d) reducing the first pressure to a second pressure higher than atmospheric pressure but lower than the first pressure of step (b) and then cooling the pre-form to below its softening point to result in a partially expanded article;

(e) transferring said article to a second vessel and heating it to a temperature above its softening point under a pressure of inert gas or air; and (f) reducing the pressure whilst maintaining temperature of said article at or above the softening point of the polymer, in order to expand the partially expanded article to form a foamed article;

wherein the cross-section of the pre-form in at least one dimension is non-uniform; and wherein the pre-form is comprised of areas of different materials.

2. The process as claimed in claim 1 wherein the pre-form is cross-linked before step (a).

3. The process as claimed in claim 2 wherein the cross-linking is carried out by irradiation.

4. The process as claimed in claim 1 wherein one or more of the areas of different material within the pre-form comprises one or more thermoplastic resins.

5. The process as claimed in claim 4 wherein one or more of the thermoplastic resins is a thermoplastic elastomer (TPE).

6. The process as claimed in claim 1 wherein one or more of the areas of different material within the pre-form includes a coagent to modify the crosslinking behaviour of the polymer.

7. The process as claimed in claim 1 wherein the pre-form is injection moulded.

8. The process as claimed in claim 7 wherein the pre-form is injection moulded using an overmoulding, insert moulding, twin or multi-shot injection or co-injection process.

9. The process as claimed in claim 1 wherein the pre-form is compression moulded.

10. The process as claimed in claim 1 wherein the pre-form is produced using an additive manufacturing or 3D printing process.

11. The process as claimed in claim 1 wherein the pre-form is extruded or co-extruded.

12. The process as claimed in claim 1 wherein the pre-form is essentially flat on one side with a contoured profile.

13. The process as claimed in claim 1 wherein the foamed article is essentially flat on one side with a contoured profile.

14. The process as claimed in claim 1 wherein the pre-form is a 3D shape.

15. The process as claimed in claim 1 wherein the foamed article is a 3D shape.

16. The process as claimed in any one of claims 1 to 15, additionally comprising the step of preparing the pre-form for step (a).

17. The process as claimed in claim 1, wherein the shape of the foamed article has substantially the same form as the shape of the pre-form.

18. The process as claimed in claim 1 wherein the foamed article has a density of less than 300 kg/m$^3$.

19. The process as claimed in claim 1 wherein the foamed article is subjected to a secondary process to produce a second 3D shape.

20. The process as claimed in claim 19 wherein the secondary process is selected from a group consisting of a thermal process, thermoforming and compression moulding.

21. The process as claimed in claim 1 wherein the foamed article is a midsole for a shoe.

22. The process as claimed in claim 1 in which in step (b) the pressure is from 20 to 1000 bar.

23. The process as claimed in claim 1 wherein the cross-section of the pre-form in at least two dimensions is non-uniform.

24. The process as claimed in claim 1 wherein the cross-section of the pre-form in at least three dimensions is non-uniform.

25. A foamed article produced by the process as claimed in claim 1.

26. The process as claimed in claim 2 wherein the crosslinking is used to control expansion behavior of one or more of the different areas.

27. A process for making a three dimensional foam article of non-uniform shape comprising the steps of:

(a) cross-linking by irradiation a polymer pre-form by exposing different areas of the pre-form to different levels of irradiation, and disposing the resulting cross-linked pre-form in a pressure vessel;

(b) subjecting the pre-form to at least one inert gas at a first pressure higher than atmospheric pressure in order to drive the at least one inert gas into the pre-form;

(c) raising the temperature of the pre-form to a temperature at or above its softening point, wherein steps (b) and (c) can take place in any order or simultaneously;

(d) reducing the first pressure to a second pressure higher than atmospheric pressure but lower than the first pressure of step (b) and then cooling the pre-form to below its softening point to result in a partially expanded article;

(e) transferring said article to a second vessel and heating it to a temperature above its softening point under a pressure of inert gas or air; and (f) reducing the pressure whilst maintaining temperature of said article at or above the softening point of the polymer, in order to expand the partially expanded article to form a foamed article;

wherein the cross-section of the pre-form in at least one dimension is non-uniform.

28. The process as claimed in claim 27 wherein exposing different areas of the pre-form to different levels of irradiation is achieved by masking the pre-form.

29. The process as claimed in claim 27 wherein exposing different areas of the pre-form to different levels of irradiation is achieved by targeting the pre-form with different levels of radiation.

* * * * *